Patented June 3, 1941

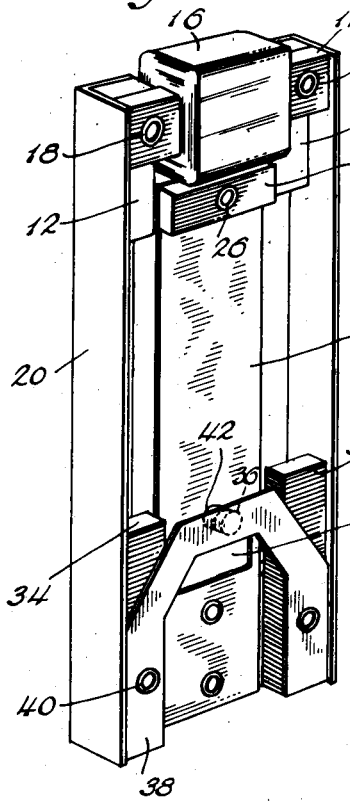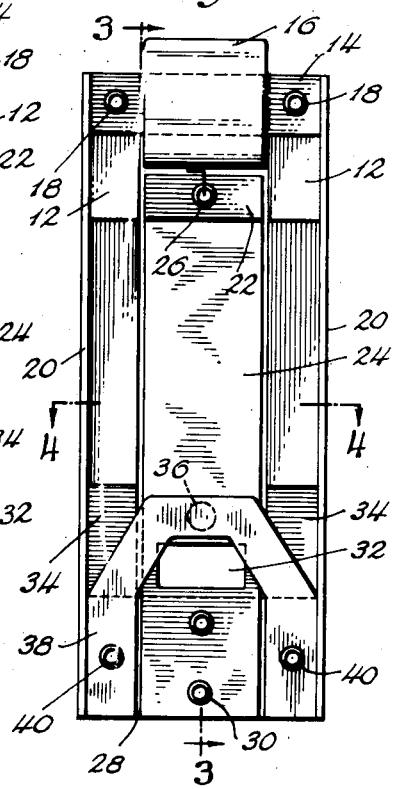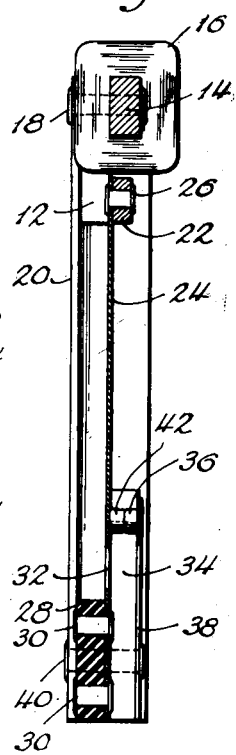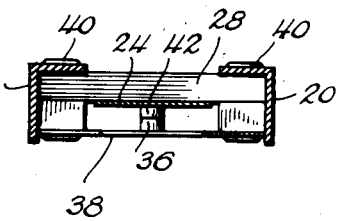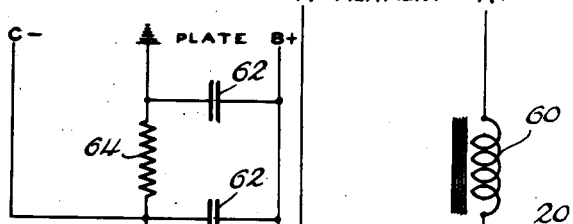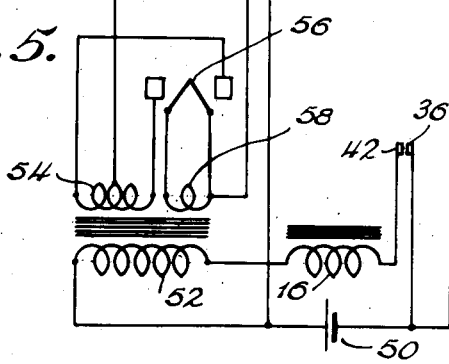
INVENTOR.
Herman B. Philips.
ATTORNEYS.

2,243,920

UNITED STATES PATENT OFFICE 2,243,920

VIBRATOR

Herman B. Philips, New Rochelle, N. Y.

Application May 12, 1939, Serial No. 273,297

6 Claims. (Cl. 200—90)

This invention relates to vibrators, especially for radio receivers operated from a low voltage direct current source.

Portable battery-operated radios have become very popular, these radios comprising a small carrying case having a built-in loop antenna and a compartment for A and B batteries, or a special battery pack comprising A and B batteries, all in addition to the parts of the radio receiver itself. Unfortunately, the life of the battery pack is comparatively short, particularly so when considered in relation to the cost of the same, which is quite high and necessarily so in view of the vast number of tiny cells which are necessary in the B battery. Another difficulty is that the battery packs have been made in different dimensions and are not interchangeable in all of these miniature radios. It is very difficult to obtain replacement batteries except in large urban centers.

The general object of the present invention is to provide a vibrator which will work satisfactorily from a very low voltage battery, specifically a single one and one-half volt cell of the standard type used for ordinary bell ringing purposes. Such a cell is inexpensive and is freely available all over the country. It is standard in voltage and dimension as well as in price.

Of course, the broad concept of using a vibrator with a direct current source, together with a step-up transformer and rectifier, in order to obtain a high B voltage, is old, this being done in many automobile radios. However, it has not heretofore been feasible to apply the same idea to a one and one-half volt dry cell, because vibrators of the type heretofore known are exceedingly inefficient and represent a large power drain. With vibrators of the type heretofore known, the ordinary one and one-half volt cell (which is customarily rated at thirty ampere hours for intermittent service) would succeed in operating a conventional miniature radio receiver for only, say, ten hours. As a matter of economy, even this might pay, for the dry cell costs only a very tiny fraction of the cost of an A and B battery pack. However, it becomes a troublesome nuisance to replace the cell at such frequent intervals, and the radio is apt to cease functioning in the middle of a desired program. It is not feasible to carry a number of these cells, because of their large size and weight.

The primary object of the present invention centers about the provision of an improved vibrator which is economical in current consumption and which has a most efficient magnetic circuit. Another important object of the invention is to provide a vibrator which will operate over a large range of voltage. The cell has an initial voltage in excess of the rated one and one-half volts, and later, as the cell is used, its voltage drops to substantially less than one and one-half volts, say, three-fourths of a volt. By making a vibrator which will operate successfully over this large range of voltage, the useful life of the cell is, of course, greatly increased. With this object in view, the reed is mounted for free movement, and the stationary contact is also spring mounted. Movement of the latter when it is moving toward the reed is limited by an insulation stop so divided and disposed as not to interfere with free movement of the reed, the latter preferably moving between the parts of the stop.

Further objects are to provide a vibrator which is simple in construction, inexpensive to manufacture, and dependable in operation.

To the accomplishment of the foregoing and such other objects as will hereinafter appear, my invention consists in the vibrator elements and their relation one to the other, as hereinafter are more particularly described in the specification and sought to be defined in the claims.

The specification is accompanied by a drawing, in which:

Fig. 1 shows a vibrator embodying features of my invention;

Fig. 2 is a front elevation thereof;

Fig. 3 is a transverse section taken in the plane of the line 3—3 of Fig. 2;

Fig. 4 is a horizontal section taken in the plane of the line 4—4 of Fig. 2; and Fig. 5 is a diagram explanatory of the manner in which the vibrator is used.

Referring to the drawing, the vibrator comprises a field magnet having a U-shaped core, said core being made up of legs 12 and a cross-bar 14. The magnet is energized by a field coil 16 surrounding cross-bar 14. The legs 12 and cross-bar 14 are appropriately secured together, as by means of the eyelets 18.

In the present case, the eyelets 18 also function to hold the parts to the frame bars 20. These are angle bars made of brass or other non-ferrous material. The legs 12 lie in the angle bars, and the cross-piece 14 extends therebetween, as will be clear from inspection of the drawing.

The field magnet cooperates with an armature 22. This is secured in any suitable manner to the upper end of a spring or so-called "reed" 24, as by means of the eyelet 26. The armature 22 has a length almost equal to the spacing between the legs 12 of the field magnet. The clearance at the ends is only a few thousandths of an inch, and has been greatly exaggerated in the drawing, partly for the sake of clarity, and partly because the scale of the drawing is many times full size. The entire unit is only about one and one-quarter inches long, and the scale of the drawing is about four times full size.

The legs 12 of the field magnet are very short and are not connected at the bottom except by the armature 22. This makes for a short, efficient magnetic circuit. The lower end of the reed is fixedly secured to an insulation spacer 28 extending transversely between the angle bars 20 at their lower ends, as is best shown in Figs. 3 and 4. In the present case, the reed is eyeletted to the spacer by means of the eyelets 30. The reed may be cut away, as is indicated at 32, thus increasing the flexibility and ease of vibration of the same.

Two pieces of insulation or stops 34 are mounted over the spacer 28 and act as spacers as well as stops for the stationary contact. The stationary contact 36 is carried at the middle of an inverted U-shaped piece of spring metal 38 the legs of which are so spaced as to fit between the angle bars. Eyelets 40 pass through the spring 38, the stops 34, the spacer 28, and the angle bars 20, thus locking the various parts of the vibrator together. The spacing between the stops 34 exceeds the width of the reed, hence the stops in no way interfere with the desired free swing of the reed.

The reed 24 carries a movable contact 42. This contact is properly aligned for cooperation with the stationary contact 36. When the reed moves to the right, as observed in Fig. 3, its movement is unimpeded except for the reaction of stationary contact spring 38. When the reed moves toward the left the stationary spring follows the reed until it engages the stops 34, whereupon the reed continues moving without the stationary contact, thereby opening the vibrator circuit.

It will be understood that when the vibrator is in its position of rest, the contacts 36 and 42 are in engagement, thus making the vibrator self-starting. This is the condition shown in Fig. 3. It will be observed in Fig. 3 that the armature 22 is displaced sidewardly from the legs 12, thus causing the armature and reed to be attracted toward the left when the supply circuit to the vibrator is closed. The resulting movement opens the contacts, following which the reed vibrates back again, and again closes the contact circuit.

The manner is which the vibrator is connected in circuit will be clear from inspection of Fig. 5 in which it will be seen that the low voltage direct current source 50, specifically an ordinary one and one-half volt, thirty-ampere hour dry cell, is connected in series with a transformer primary 52, and the field coil 16 of the vibrator. The contacts 36, 42 are also in the series circuit. The resulting operation of the vibrator produces a pulsating current in transformer primary 52 and this introduces an alternating current in the transformer secondary 54. The transformer is preferably a high-ratio step-up transformer in order to produce a high voltage alternating current. This is rectified in a suitable rectifier 56. The filament of the rectifier may be heated by current obtained from auxiliary transformer secondary 58.

The filaments of the tubes of the radio set are heated directly from the cell 50, and a choke 60 is preferably inserted in series. The rectified plate voltage is preferably filtered, as by means of the shunt condensers 62 and the series resistor 64. The latter may also be used to develop the desired bias voltage for the radio receiver.

It is believed that the construction and operation, as well as the many advantages of my improved vibrator, will be apparent from the foregoing detailed description thereof. The magnetic circuit of the vibrator is very short and efficient, yet affords unlimited vibration of the reed, thereby making the vibrator useful over a substantial range of voltage. The relation of the reed to the magnet, the reed lying in a plane coinciding with or parallel to the plane of the magnet, is such that a very close tolerance may be used between the ends of the armature and the side walls of the magnet legs. No increase in air gap or tolerance is needed in order to accommodate an excess swing of the vibrator. In fact, the vibrator may be, and preferably is, designed to operate on a low voltage, say, three-fourths of a volt, yet it is also satisfactory when operating at one and one-half volts. In this way the effective life of the cell is increased. The vibrator is adapted to operate at high frequency, thus minimizing problems of rectification and hum. With this vibrator, I have operated a portable radio receiver while using a current of only about one-half ampere for the vibrator and receiver. This corresponds to an operating life of about sixty hours, which is very good considering how inexpensive the standard dry cell is compared to an A and B battery pack. The simple and inexpensive construction will also be evident from the foregoing description.

Of course, the vibrator is not limited to use for a portable radio. It may be used in a cabinet or non-portable radio, as on farms, and it may also be used to make particularly tiny pocket receivers using a flashlight cell instead of a large cell, as for example, for an army officer in the field. It may also be used to obtain a high B voltage for small portable transmitters where a short battery life is adequate.

It will be apparent that while I have shown and described my invention in a preferred form, many changes and modifications may be made in the structure disclosed, without departing from the spirit of the invention defined in the following claims.

I claim:

1. A vibrator comprising a magnet having a field coil wound thereon, an armature, a thin strip of spring metal or reed fixedly mounted at one end and carrying the armature at its opposite end, a movable contact carried by said reed, a stationary contact cooperating with said movable contact, said stationary contact being mounted on a yieldable spring member adapted to move with the reed when the reed is moving in one direction, and split stop means operating to limit the movement of the stationary contact in the other direction, said stop means being so disposed that they intercept the yieldable spring member but do not interfere with free vibration of the reed regardless of the amplitude of vibration.

2. A vibrator comprising a U-shaped magnet having a field coil wound thereon, an armature dimensioned to fit between the legs of the core, said legs being open ended except for the effect of the armature, a reed fixedly mounted at one end and carrying the armature at its opposite end, said reed being disposed in a plane generally parallel to the plane of the aforesaid U-shaped core, a movable contact carried by said reed, a stationary contact cooperating with said movable contact, said stationary contact being mounted on a yieldable spring member adapted to move with the reed in one direction, and split stop means operating to limit the movement of the stationary contact in the other direction, said stop means being so disposed that they intercept the yieldable spring member but do not interfere with free vibration of the reed regardless of the amplitude of vibration.

3. A vibrator for radio sets operated from a low voltage direct current source, said vibrator comprising a U-shaped magnet having a field coil wound about the cross-bar of the U-shaped core, an armature dimensioned to fit between the legs of the core close to the field coil, said legs being short and terminating at the ends of the armature, a reed fixedly mounted at one end and carrying the armature at its opposite end, said reed being disposed in a plane generally parallel to the plane of the aforesaid U-shaped core, a movable contact carried by said reed, a stationary contact cooperating with said movable contact, said stationary contact being mounted on a yieldable spring member adapted to move with the reed in one direction, and two insulation stops operating to limit the movement of the stationary contact in the other direction, said stops being disposed on opposite sides of the reed so that they do not interfere with free movement of the reed, the reed moving between said stops.

4. A vibrator comprising two angle bars made of non-ferrous material, a U-shaped magnet core disposed at one end of said bars, said magnet core comprising legs nested in the bars and a cross-bar extending from one leg to the other between said bars, said parts being secured together and to the bars, a field coil wound about said cross-bar, an insulation spacer extending transversely between the opposite ends of the angle bars, a reed secured to said insulation spacer, insulation stops disposed longitudinally in said angle bars against said spacer, a U-shaped spring having its legs secured in place against said stops, a stationary contact on the cross-bar of said U-shaped spring, a movable contact on said reed for cooperating with said stationary contact, an armature secured to the movable end of the reed for movement between the legs of the field coil, said legs being open ended except for the effect of the armature, and the spacing between the ends of the armature and the legs being very small.

5. A vibrator for radio sets operating from a low voltage direct current supply, said vibrator comprising two spaced parallel angle bars made of non-ferrous material, a U-shaped magnet core disposed at one end of said bars, said magnet core comprising legs nested in the bars and a cross-bar extending from one leg to the other between said bars, said parts being secured together and to the bars, a field coil wound about said cross-bar between said angle bars, a piece of insulation extending transversely between the opposite ends of the angle bars, a reed secured thereagainst, a contact spring, insulation means spacing said spring from said reed, a stationary contact on the spring, a movable contact on said reed for cooperating with said stationary contact, an armature secured to the movable end of the reed for movement between the legs of the field coil, said legs terminating at the ends of the armature and the spacing between the ends of the armature and the legs being very small.

6. A vibrator for radio sets operating from a low voltage direct current supply, said vibrator comprising two spaced parallel angle bars made of brass, a U-shaped magnet core disposed at one end of said bars, said magnet core comprising legs nested in the bars and a cross-bar extending from one leg to the other between said bars, said parts being secured together and to the bars, a field coil wound about said cross-bar between said angle bars, an insulation spacer extending between the opposite ends of the angle bars, a reed secured to said insulation spacer, insulation stops disposed in said angle bars against said spacer, a U-shaped spring having its legs spaced an amount greater than the width of the reed, said legs resting on said stops and being secured in place by fastenings passing through the legs, stops, spacer and angle bars, a stationary contact on the cross-bar of said U-shaped spring, a movable contact on said reed for cooperating with said stationary contact, an armature secured to the movable end of the reed for movement between the legs of the field coil, said legs being open ended except for the effect of the armature, and the spacing between the ends of the armature and the legs being very small.

HERMAN B. PHILIPS.